April 8, 1941.   H. E. JONES   2,237,440
AUTOMATIC CONTROL INSTRUMENT
Filed Feb. 23, 1933   4 Sheets-Sheet 1

Inventor:
Herbert E. Jones,
By [signature]
atty.

April 8, 1941. H. E. JONES 2,237,440
AUTOMATIC CONTROL INSTRUMENT
Filed Feb. 23, 1938 4 Sheets-Sheet 3

Inventor:
Herbert E. Jones,
By [signature]
atty.

Patented Apr. 8, 1941

2,237,440

UNITED STATES PATENT OFFICE 2,237,440

AUTOMATIC CONTROL INSTRUMENT

Herbert E. Jones, Colorado Springs, Colo., assignor to Kansas City Testing Laboratory, Kansas City, Mo., a corporation of Missouri Application February 28, 1938, Serial No. 193,215

12 Claims. (Cl. 172—282)

This invention relates to automatic controls for airplanes, airships or marine ships and to a new and improved method for controlling all types of transports.

One object of the invention is to provide an apparatus for keeping an airplane or marine vessel or any other type of transport using a directional radio beam on the beam by automatic means.

Another object of the invention is to provide a means by which any type of television transmitter can be focused on an object moving with respect to the transmitter, and kept in focus on that object as long as it is in the field of view of the instrument.

A further object of the invention is to provide a new and improved method and apparatus for measuring the drift of an airplane, recording this drift automatically on a dial or other means of record, and having the usual automatic pilot correct the course automatically for this drift.

Another object is to provide an instrument which can be used in an airplane to automatically keep the plane on the course defined by a radio beam and which is more sensitive than the usual method of having the pilot notified of any tendency to fly off course by audible means.

Other objects will appear as the description proceeds.

In its more important aspects, the invention relates to automatic control instruments operable by a controlling source of electrical signal impulses, for instance, a radio beam or a cathode ray transmitting tube. Essentially, these instruments include a cathode ray receiving tube or oscillograph, means for producing a visible light signal on the screen of said tube, means responsive to a controlling source of electrical impulses for varying said light signal, and control means responsive to said varying light signal. The control means responsive to the varying light signal include a reflecting prism associated with the receiving tube, photo-electric cells adapted to receive light reflected from said prism, amplifiers for the current generated in said cells when necessary, and connections from said cells to a motor having opposing direct current armatures which may be in turn connected to an automatic pilot or other object to be controlled.

According to one embodiment of the invention, an instrument is provided which may be utilized in conjunction with a radio beam and with means ordinarily used for picking up the beam and translating it into an audible signal. In this case, however, the beam is translated into a visible signal. This is accomplished by picking up the beam and amplifying it in the usual manner then translating it into electrical impulses and impressing said impulses on the electron gun of a cathode ray receiving tube which also comprises a fluorescent screen, deflecting means for the cathode beam and a sweep circuit connected to said deflecting means and adapted to cause the cathode beam to swing back and forth on the fluorescent screen.

The radio beam may be the ordinary beam used in guiding airplanes where the A and N signals are employed to indicate off course. The varying intensity of these signals will be reflected upon the fluorescent screen and be visible to the operator. When the ship is on course the signals will form a continuous line across the screen as hereinafter more fully described. This instrument may be used in conjunction with the usual type of audible signals by connecting the plate circuit of the final audio amplifier to the control grid of the cathode beam.

In accordance with the invention, means are also provided for automatically controlling the course of an airplane or other transport. This is accomplished by placing a reflecting prism in front of the fluorescent screen of a cathode ray receiving tube in a manner such that light produced by bombardment of the cathode ray on the fluorescent screen is reflected from said prism to oppositely placed photo-electric cells. The light beams set up impulses in these cells which are transferred to a motor having a plurality of armatures electrically connected to the cells and opposed to each other in such a manner that when the currents from said cells are equal, the torque in each of said armatures is equal and there is no motion in the rotor of the motor. This motor is connected to an automatic pilot of the usual type in any suitable manner such that the pilot is operated to correct the course of the plane when the motor rotates.

This instrument when used in an airplane to automatically keep the plane on the course defined by radio beam is more sensitive than the usual method of having the pilot notified of any tendency to fly off course by audible means. It also enables the pilot, after once having put the plane on its course to devote his time to other necessary functions since the apparatus will work entirely automatically.

According to another modification of this invention, means are provided for automatically focusing a cathode ray transmitter or transmitting tube upon an object and keeping it focused upon the object as long as it is in the field of view of the instrument. This is accomplished by providing one or more cathode ray transmitting tubes having electron guns, photo-electric screen and deflecting means, and connecting said transmitting tube or tubes with a cathode ray receiving tube provided with an electron gun, deflecting means, a fluorescent screen, a rectangular prism associated therewith in the path of the cathode ray beam formed by the electron gun. This prism in turn reflects light in four directions to two opposing pairs of photo-electric cells. Each pair of cells is connected to a motor having opposing direct current armatures and each motor is connected to a transmitter, one motor serving to move the transmitter horizontally and the other vertically. As long as the intensity of light is the same in all directions from the reflecting prism, the focus of the transmitter will not be changed because the current in the armatures is the same, but as soon as any change in intensity occurs, the rotors of the armatures will rotate and correct the focus of the transmitter. This enables a transmitter to be set on a distant object such as a lighthouse or enemy vessel and to have this instrument automatically kept directly on the object regardless of the motion of either the object or the transmitter. Such a device is particularly suitable for use with a navigation instrument such as described in my copending application, Serial No. 193,216, filed of even date herewith.

Another embodiment of this invention provides for measuring the drift of an airplane and recording this drift automatically on a dial or other recording means. This embodiment also provides for having the usual automatic pilot correct the course automatically for this drift.

Drift control is effected by connecting a cathode ray transmitting tube which is pointed at the ground to a cathode ray receiving tube having a variable band screen associated therewith. The transmitter is preferably provided with an infra-red filter and an infra-red sensitive photo-electric screen as described and claimed in my copending application, Serial No. 737,311, filed July 27, 1934. This device penetrates fog and haze, and hence renders the apparatus operable at all times in spite of low visibility. The variable band screen associated with the receiver is preferably placed in the path of the cathode ray of the receiver behind its fluorescent screen. As the light from the objects in the field of the cathode ray transmitting tube is transmitted to the cathode ray receiving tube and thence through the variable band screen, it is focused by any suitable means, as, for example, a lens, upon a photo-electric cell which in turn is connected to an alternating current amplifier. The latter in turn is connected to deflecting plates of a cathode ray oscillograph. Other deflecting plates of this oscillograph are connected to a sweep circuit. The cathode ray oscillograph is provided with a fluorescent screen with which is associated a reflecting prism and oppositely placed photo-electric cells controlling opposing direct current armatures which in turn control an automatic pilot, as previously described.

In the variable band screen the bands are placed in parallel relationship. If objects are drifting parallel to the bands of the screen there will be no voltage fluctuation in the deflecting plates connected with the alternating current amplifier, but otherwise there will be a voltage fluctuation which will cause the motor control connected to the automatic pilot to change the course of the plane by an angle equal to the angle through which the bands of the screen have turned. This angle can be recorded on a dial through an auxiliary gear so that the pilot can know at all times the angle of drift without additional measurements or observations.

The details of the various embodiments generally described above are given in the following description in conjunction with the accompanying drawings in which.

Figure 1:
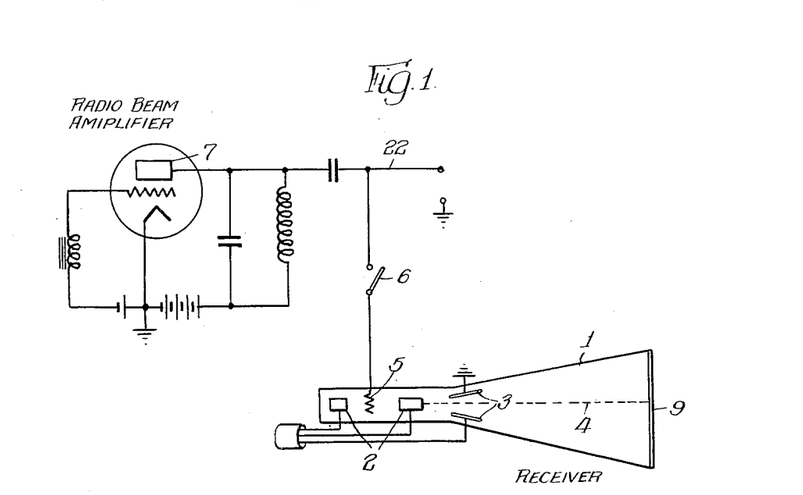
Fig. 1 represents diagrammatically means for picking up a radio beam and translating it into a visual image on a cathode ray receiving tube.
Figure 2:
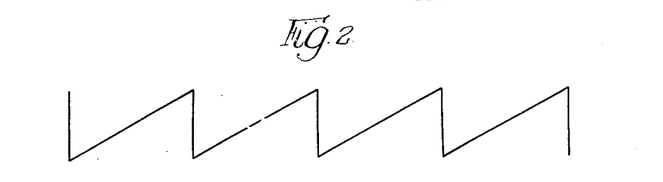
Fig. 2 represents diagrammatically the sawtooth type of sweep circuit used in the cathode ray receiving tube of Fig. 1.

In Fig. 1 is shown a cathode ray oscillograph 1 with the ordinary cathode gun 2 and deflecting plates 3. For use in the present apparatus the vertical deflecting plates are not used, so they are not shown in the drawings. The cathode beam 4 is modulated by control grid 5 which controls the intensity of the cathode beam. This beam 4 is focused on a fluorescent screen and is caused to swing back and forth due to the electrostatic action of deflecting plate 3. The sweep circuit controlling the voltage of the deflecting plates 3 is of the sawtooth type used in many oscillographs and is pictured diagrammatically in Fig. 2.

Control grid 5 is connected through switch 6 to the plate circuit of the final audio amplifier 7 of the ordinary radio picking up the radio beam, so that the signal coming over this circuit is translated to the cathode beam 4 by the fluctuating current in grid 5.

Figure 3:
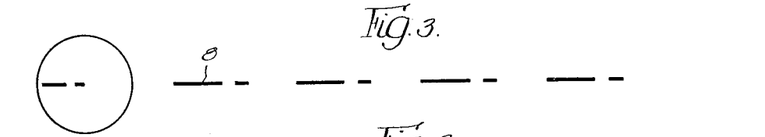
Figs. 3 and 4 represent the N and A signals used to indicate off course.
Figure 4:
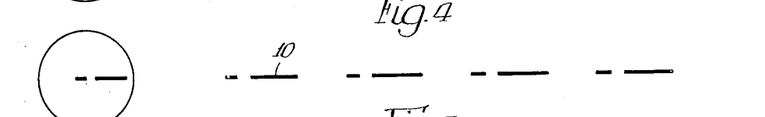
Figure 5:
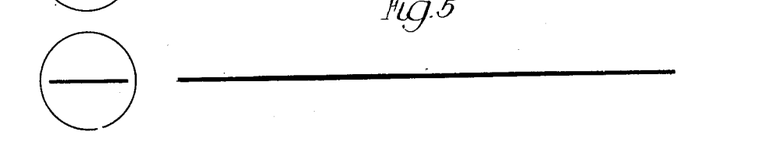
Fig. 5 represents the appearance of the visual signal when the transport is on course with the radio beam.

The radio beam is of the ordinary beam type used in guiding airplanes where the A and N signals are used to indicate off course. The sweep circuit is so synchronized with these signals that their reception is as shown in Figs. 3, 4 and 5. If the plane is off course such that the N signal only is head, we have the N signal 8 appearing on the screen 9 as shown in Fig. 3. If the plane is off course so that the A signal 10 is heard only, we have the condition shown in Fig. 4. If the plane is on course we have the continuous signal due to the combination of the N and the A signals as shown in Fig. 5.

To set the sweep circuit in synchronization with the radio beam signal, the pilot would have to fly to the N side of the course so that the N signal would be distinctly heard over the A signal, then by adjusting the sweep circuit control the signal could be brought into the position shown in Fig. 3. If the plane was in such a position as Fig. 3, most of the light on the fluorescent screen 9 would be on the left side; if the plane was in the position of Fig. 4, most of the light on fluorescent screen 9 would be on the right side. If the plane is on course, the light on screen 9 would be distributed equally across the screen.

Figure 6:
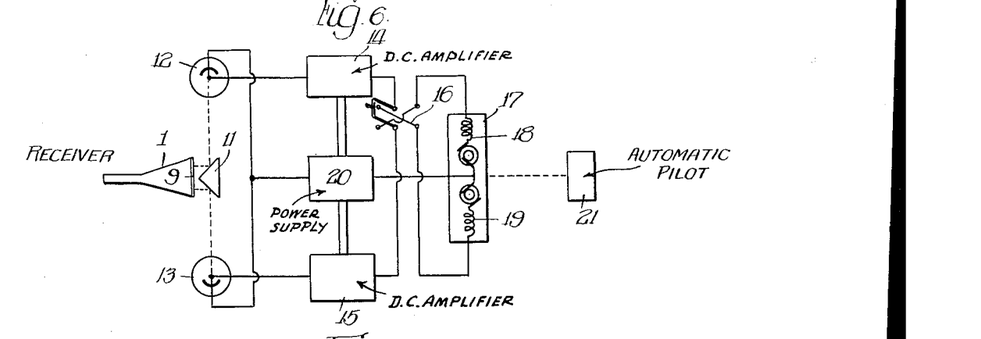
Fig. 6 diagrammatically represents a method of correcting the course by means associated with a cathode ray receiving tube.

To indicate automatically which side of the course the plane is on and to correct for this off course movement, a device is connected to the oscillograph as shown in Fig. 6. The oscillograph is shown as 1 and the signal as described above appears on screen 9, swinging back and forth in the plane of the drawings. A reflecting prism is shown at 11 and two photo-cells at 12 and 13. The light from the path of the cathode beam 4 on fluorescent screen 9 is reflected by prism 11 to the photo-cells 12 and 13. The plate circuits of these photo-cells are amplified by direct current amplifiers 14 and 15 and are connected through switch 16 to a motor 17 through the two armatures 18 and 19. These two armatures are opposed to each other such that when the currents in the plate circuits of the two photo-cells 12 and 13 are equal, the torque in 18 and 19 are equal and opposite and there is no motion in the rotor of motor 17. This condition of equal currents will occur when the light is of equal intensity on both sides of prism 11. This is under the condition of "on course" as pictured in Fig. 5. If the plane starts to move off course, say on the A side, we have a condition pictured by Fig. 4. The intensity of the light will increase on the right side of the prism and decrease on the left side, causing a greater current in the plate circuit of phototube 12 than in the plate circuit of phototube 13. This gives a predominant torque to armature 18, when switch 16 is closed to the right, which will cause motor 17 to rotate in the direction defined by armature 18. If the plane moves to the N side of the course, then phototube 13 will have a greater plate circuit than 12 and armature 19 will dominate, causing motor 17 to rotate in the opposite direction. When the plane returns to the one course signal, both circuits are balanced and there is no rotation in motor 17. The power to the motor, phototubes, and amplifiers is supplied through a power unit 20. The armatures are connected to the direct current amplifiers through a reversing switch 16. This is necessary since in one case the N signal must produce a certain direction of rotation in motor 17 and in another case the N signal must produce the opposite rotation in motor 17.

Motor 17 is directly connected to the automatic pilot 21 in such a manner that when motor 17 rotates it changes the course of the ship in such a direction as to correct the off course movement, this speed of the correction being proportional to the amount the ship is off course, being in turn proportional to the difference in intensity of the two plate circuits of the phototubes 12 and 13.

Figure 7:
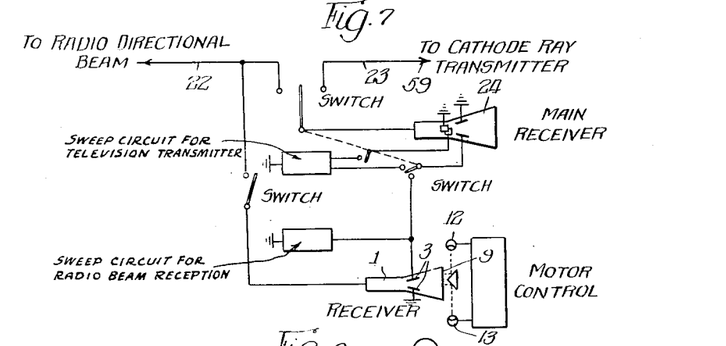
Fig. 7 illustrates diagrammatically an optional hook-up where the transport is flying on a beam signal but is also equipped with a television transmitter and receiver for navigation.

If the plane is equipped with a navigation instrument such as described in my copending application, Serial No. 193,216, filed of even date herewith, then the signal circuit from the radio beam can be connected with one of the main receivers for the cathode ray transmitters and also with another smaller receiver equipped with the prism and photo-cells as shown in Fig. 7. These two receivers are so connected that the pilot can adjust the signal in his main receiver and after having so adjusted, connect the beam signal with the automatic control and use his main receiver for other purposes. These connections are shown schematically in Fig. 7. Circuit 22 is the signal circuit from the radio directional beam. Circuit 23 is the signal circuit from a haze penetrator. Receiver 24 is the pilot's main receiver, and 1 is the receiver with automatic direction control. The opposed motor control responding to photoelectric cells 12 and 13 is the same as shown in Fig. 6.

Figure 8:
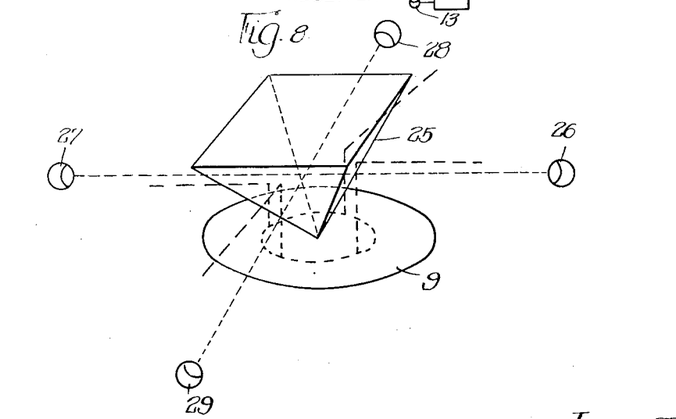
Fig. 8 represents a rectangular reflecting prism which can be used in conjunction with the apparatus described in Figs. 6 or 7 for maintaining a cathode ray transmitting tube or transmitter in focus on any particular object.

A television transmitter or cathode ray transmitting tube can be held on an object by the use of the automatic control described above, using two controls, for two planes of motion. In this case, instead of a simple reflecting prism shown in Fig. 6, one can use a pyramidal prism as shown in Fig. 8 with four reflecting faces. The point of the prism 25 is directly over the center of the fluorescent screen of a television receiver 9. The object on which it is desired to hold the transmitter is focused on the central spot. Four phototubes are arranged as shown at 26, 27 28 and 29. Phototubes 26 and 27 control an opposing motor such as described in Fig. 6 to control horizontal movements of the transmitter, while phototubes 28 and 29 similarly control another opposing motor controlling the vertical movements of the transmitter. A motion of the object away from the central spot will cause the opposing motors to rotate which will bring the object back to the central position. A reversing switch such as 16 in Fig. 6 is used here also. In one position it will set the control to hold on a bright object with a darker background, while in the reverse position it will hold on a dark object with a bright background.

Using this same general means of prism and photocells, an automatic drift gage can be used in connection with a cathode ray transmitting tube, as hereinafter described.

Figures 9, 10:
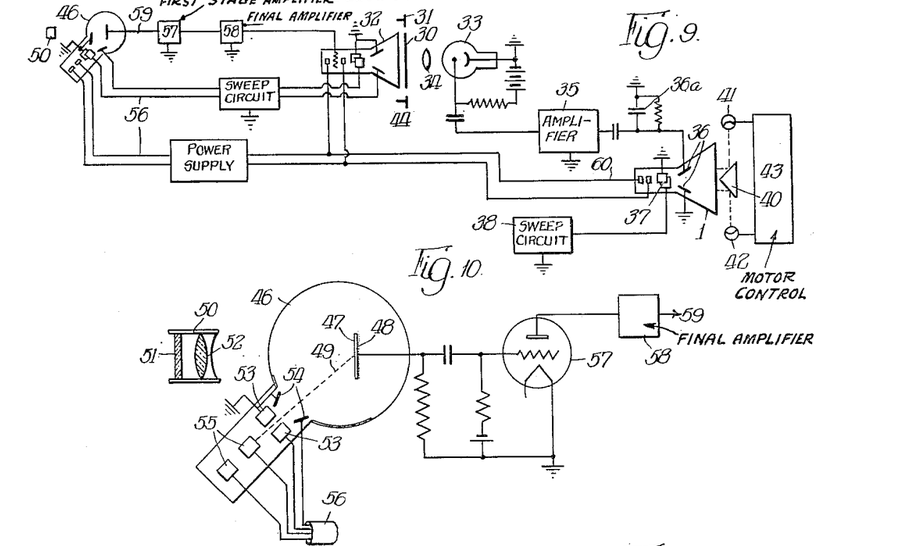
Fig. 9 illustrates diagrammatically a drift recording and control mechanism.
Fig. 10 illustrates diagrammatically a type of cathode ray transmitting tube suitable for use in conjunction with the drift control mechanism of Fig. 9.

This is shown diagrammatically in Figs. 9, 10, 11, 12, 13 and 14. A small cathode ray receiver is shown at 32 (Fig. 9) with a covering screen 30, as shown in more detail in Fig. 11. This covering screen is so constructed that it has parallel bands, each band having a decreasing intensity of transparency from left to right. That is, the left edge of any band is more transparent than the right edge and the change in transparency is practically linear. It also has a thin circular band of variable transparency around the outer edge of the screen such that the transparency increases towards the inner edge of this circular band. Screen 30 can be rotated by gear 31 such that the objects in the field of the screen will move parallel with the bands. The image on receiver 32 is from a cathode ray transmitter such as shown in Fig. 10 pointed directly at the ground so that the image on receiver 32 will be of the objects on the ground directly beneath the plane. As the ground objects move parallel to the bands there will be practically no variation in the intensity of the field as a whole, but if the objects move at an angle across the bands, there will be a variation in intensity of light as bright objects move from the transparent parts of the bands to the more opaque parts. If bright objects move from the upper right of the field to the lower left, the intensity will increase slowly and then suddenly drop, then increase slowly again and drop suddenly. If the objects move from the upper left to lower right, the intensity of a bright spot will decrease slowly and suddenly rise.

The light coming through screen 30 is focused on a phototube 33 by lens 34. As objects move across the field of oscillograph 32 they will produce a signal current in the plate circuit of phototube 33. This signal current will be constant, of the form shown in Fig. 12, or of the form shown in Fig. 13, depending on whether the objects move across the field parallel to the bands on screen 30, across from upper right to lower left, or across from upper left to lower right, respectively.

Figure 15:
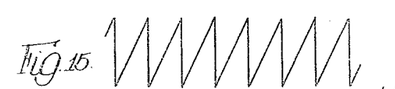

This signal current is amplified by a transformer coupled amplifier 35. The output of this amplifier is connected to the vertical deflecting plates 36 of cathode ray oscillograph 1. The voltage on the horizontal deflecting plates 37 of this oscillograph is controlled by sweep circuit 38 having a wave form shown in Figs. 14 and 15.

Figures 11, 12, 13, 16:
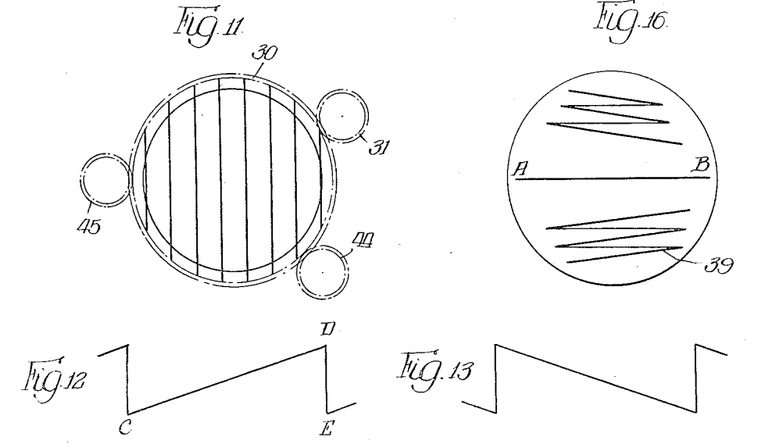
Fig. 11 illustrates a variable band screen suitable for use in conjunction with the drift control mechanism of Fig. 9.
Figs. 12, 13, 14 and 15 illustrate diagrammatically the wave forms for varying currents set up by movements of objects across the variable band screen in the apparatus of Fig. 9.
Fig. 16 represents diagrammatically the screen of cathode ray receiving tube 1, showing the effect caused by an object moving diagonally across the parallel bands of variable screen 30.
Figure 14:
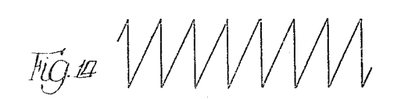

If objects are drifting by parallel to the bands of screen 30, there will be no voltage fluctuation in the vertical deflecting plates 36, and the cathode beam will form in a line across the screen of tube 1, Fig. 9, as shown by line A—B in Fig. 16. If objects are moving from upper right to lower left, the input to amplifier 35 will have a wave form as shown in Fig. 12. But as the current increases very slowly from C to D, Fig. 12, there will be practically no output from the transformer coupled amplifier 35. But when the sudden drop occurs from D to E, Fig. 12, there will be a surge in the output circuit of amplifier 35 and this surge in voltage will charge the vertical deflecting plates 36 and cause the cathode beam of oscillograph 1 to be swung to the lower part of the fluorescent screen 1. The condenser and resistance leak 36a are connected in parallel across the vertical deflecting plates 36 and are so adjusted that the charge on the deflecting plates 36 will leak off slowly. As soon as the surge D to E, Fig. 12, is completed there will be no current produced in the output of amplifier 35 until the next surge. In the meantime the charge setup in deflecting plates 36 will have leaked off and the cathode beam of oscillograph 1 will return to the central position, but the next surge will again pull the beam to the lower part of the fluorescent screen. These downward surges in combination with the horizontal deflecting plates 37 will cause the lower half of the fluorescent screen of tube 1 to be light as shown by the lines 39 in Fig. 16.

If the object moves from the upper left to the lower right giving a signal current as shown by Fig. 13, the surge in the output of amplifier 35 will be reversed, the charge on the vertical deflecting plates 36 will also be reversed and the lines will form in the top half of the fluorescent screen of tube 1.

The narrow circular band of variable transparency is to prevent a surge in the plate circuit of phototube 33 when an object comes suddenly into the field of view of oscillograph 32, or suddenly leaves the field. As the transparency of this circular band increases towards the inner edge, an object will come into the field of view gradually and leave gradually, preventing any surge in the plate circuit of phototube 33.

The reflecting prism 40 is set with its sharp edge opposite line A—B, Fig. 16, and any light on the screen of tube 1 is reflected to the two phototubes 41 and 42 connected to an opposing motor control 43, as was described above. Therefore, if objects in the field of tube 32 do not move across the screen 30, parallel to the bands, more light will be intensified on one side of the screen of tube 1, as described above, and the motor of control 43 will start rotating.

This motor is connected to gear 31 which rotates screen 30 in such a manner as to cause the bands of screen 30 to be parallel with the drifting objects across this field. The motor in 43 is also connected to the automatic pilot to change the course of the automatic pilot by an angle equal to the angle through which the bands of screen 30 have been turned.

If the plane is not drifting and the bands of screen 30 are parallel to the longitudinal axis of the plane, the objects will drift parallel to the bands and no change of the automatic pilot will take place. If the plane is drifting, the control described above will cause the screen 30 to rotate until the bands are parallel to the drift and also cause the automatic pilot to correct for this drift. This brings the control into balance and the plane will be corrected for drift until the drift changes, but as it changes, the automatic pilot will correct for this drift automatically by means of the control described here. The angle through which the screen 30 has been turned can be recorded on a dial through an auxiliary gear 44 so the pilot can know the angle of drift at all times without additional measurements or observations. Gear 45 is for manual adjustment of screen 30.

A suitable type of cathode ray transmitting tube or transmitter for use in conjunction with the apparatus illustrated in Figs. 7 and 9 is shown in Fig. 10. This transmitting tube consists of an iconoscope tube 46 in which is enclosed a plate 47 made of an insulating material such as mica and having a silver or platinum backing 48. On the face of plate 47 are a plurality of photosensitive elements uniformly distributed over the plate. These elements consist of some photo-electric sensitized material which is especially sensitive to infra-red radiations such as caesium oxide sensitized by a special process. Each element acts as a tiny photocell which forms a condenser with the backing 48. As light falls on these elements, a charge is built up proportional to the light intensity of the image at that point and is discharged in succession by a cathode ray beam 49.

An image of the object is formed on photoelectric sensitive plate 47 by means of an optical system 50 containing a filter 51 and a lens 52. The filter 51 passes substantially infra-red radiations only. This filter is optional and is only required in the case of fog or the like. Plate 47 is scanned by cathode beam 49 by means of alternating current supplied to deflecting plates 53, 53 and 54, 54. The cathode beam is developed by an electron gun 55. Power is supplied to the cathode and anode of the electron gun 55 through cable 56 connected to a power supply source, not shown. Deflecting plates 53, 53 and 54, 54 are connected to sweep circuits preferably having a common source of potential.

As cathode beam 49 scans plate 47 point by point it causes current impulses to be impressed in the grid circuit of an amplifying tube 57. The signals set up in this tube then pass through a second stage of amplification 58. The resultant electrical impulses are then impressed upon the control grid of the electron gun of one of the cathode ray receivers and serve to modulate the cathode beam in said receiver or receivers. The transmitter or transmitters are interconnected with the receiver or receivers in such a manner that as the cathode beam scans the photo-electric mosaic screen in each transmitter, a cathode beam in a receiver correspondingly scans a fluorescent screen. This is accomplished by electrical connections between the deflecting plates of the transmitter and deflecting plates of the receiver. Thus, in Fig. 9 the circuit 59 connects with circuit 59 of Fig. 10 and cable 56 in Fig. 10 connects with sweep circuits and a source of power supply which in turn connect with deflecting plates, not shown, in receiver 32. Receiver 32 is provided with horizontal and vertical deflecting plates and the hookup between receiver 32, Fig. 9, and the transmitter in Fig. 10 may be substantially the same as described in my copending application, Serial No. 737,311, filed July 27, 1934. In Fig. 9 the transmitting tube 1 is connected to a source of potential through a connecting cable 60.

Figure 17:
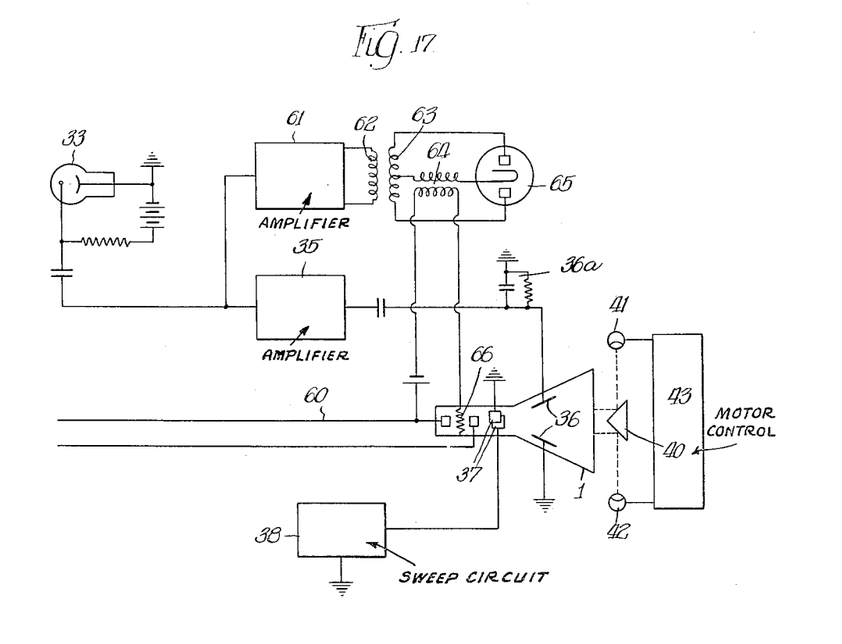
Fig. 17 illustrates an auxiliary circuit which may be inserted between the photo-cell and the oscillograph shown in Fig. 9 for the purpose of intensifying the cathode beam immediately after it has been swung to the top or the bottom of the fluorescent screen.

In some cases the change in the signal current of phototube 33, such as indicated from C to D in Fig. 12, may be so rapid as to cause the lines 39 to be swung clear across the whole field of the fluorescent screen of tube 1 instead of being confined to the lower half. In such a case the light might be of equal intensity above and below line A—B, Fig. 16, and the control 43 would not function. To compensate this action an additional circuit can be added between phototube 33 and oscillograph 1 which will cause the intensity of the cathode beam in tube 1 to be greatest at the moment and immediately after the beam has been suddenly swung to the bottom or the top. Thus, the light on the screen of tube 1 will be greater in the lower or upper half depending on the direction of the surge. This is shown in Fig. 17. In this modification the signal current from phototube 33 is connected to the input of another transformer coupled amplifier 61. 62 is the primary of the transformer of the final stage of amplification. The secondary 63 of this transformer is center tapped, the center tap being connected through transformer 64 to the cathode of tube 65. The two ends of the secondary 63 are connected to the two plates of tube 65 as shown.

As described above, there will be surges in the input signal current from phototube 33 and the direction of the surges will depend on the direction of the drift of the objects across the bands of screen 30. But regardless of the direction of the surges through the primary 62, the surge through transformer 64 will always be in the same direction due to the rectifying action of tube 65. The output of transformer 64 is connected to the control grid 66 of oscillograph 1 and is so adjusted that when there is little or no current through transformer 64 the intensity of the cathode beam in oscillograph 1 is small. But when a surge comes through transformer 64, the control grid 66 becomes positive with respect to the cathode of oscillograph 1 and the intensity of the cathode ray in tube 1 is greatly increased.

Since these surges through amplifier 61 and amplifier 35 occur at the same time the intensity of the cathode beam in oscillograph 1 will be greatest when the beam is suddenly pulled to one side. As it slowly swings back toward a central position and maybe past the central position, the intensity of the cathode beam diminishes. Therefore, the intensity of the beam will be greatest at the time and immediately after the surge and the greatest amount of light will occur in that half of the screen of oscillograph 1 as controlled by the direction of the surge through deflecting plates 36 as heretofore described, and control 43 will give the proper correction.

It will be understood that variations may be made in the apparatus described without departing from the invention. Thus, the number of deflecting plates for the cathode beam in a receiver or cathode ray oscillograph may vary. For instance, in the automatic control associated with a radio directional beam, as described with reference to Figs. 1 to 7, the cathode ray oscillograph is used in combination with a simple reflecting prism and has only two deflecting plates for the cathode beam. On the other hand, where it is desired to use an apparatus of the character described for focusing a cathode ray transmitting tube or tubes on an object which is moving relative to the aircraft or other transport, a rectangular prism is employed and the cathode ray oscillograph has both horizontal and vertical deflecting plates for the cathode beam. The electrical connections between transmitting tubes and cathode ray receiving tubes or between radio beam amplifiers and cathode ray receiving tubes may be varied without departing from the invention. It is preferable for the purpose of this invention that a common source of potential be used for transmitting tubes, receiving tubes, amplifiers, sweep circuits and the like, thereby providing a unitary portable device which is readily constructed and used. The common source of potential is not necessary, however, in every instance and variations in this respect may be made. As previously pointed out, the infra-red filter in the transmitter may be removed for some purposes where low visibility is not a factor.

As previously indicated, control instruments of the character herein described may be responsive to bright objects in a field or to objects darker than the field. By broadcasting a directional radio beam from a point of origin, control instruments of the character herein described may be used to control torpedoes and other automotive objects to a destination.

Having thus described the invention, what I claim as new and desire to secure by Letters Patent of the United States is:

1. In an automatc control instrument, the combination of, a cathode ray receiving tube, a reflecting prism associated with said receiving tube located in such a manner that the light produced by the bombardment of the cathode ray on a fluorescent screen in said tube is reflected from said prism, photo-electric cells adapted to receive light reflected from said prism and a direct current motor having a plurality of armatures electrically connected to said cells and opposed to each other such that when the currents from said cells are equal the torque in each of said armatures is equal and there is no motion in the rotor of the motor.

2. In an automatic control instrument, the combination of, a cathode ray receiving tube, a pyramidal reflecting prism associated with said tube and located in such a manner that the light produced by the bombardment of the cathode ray on a fluorescent screen in said tube is reflected from said prism, photo-electric cells adapted to receive light reflected from said prism and electrical means having direct current opposing armatures electrically connected to opposing photo-electric cells.

3. In an automatic control instrument, the combination of, a cathode ray receiving tube, a variable band screen associated with said tube in such a manner that the light produced by the bombardment of the cathode ray in a fluorescent screen is reflected through said variable band screen, a photo-electric cell, means for focusing light rays passing from the cathode ray receiving tube through the variable band screen onto the photo-electric cell, means for amplifying current set up in said cell, electrical connections between the current amplifying means the photo-electric cell and a pair of oppositely placed deflecting plates of a cathode ray oscillograph and a second pair of oppositely placed deflecting plates in said oscillograph connected to a sweep circuit whereby the beam of the cathode ray oscillograph is caused to scan a fluorescent screen and is modulated by the deflecting plates connected to the photo-electric cell.

4. An automatic control instrument for movable objects comprising, in combination, a cathode ray receiving tube, means for producing a visible light signal on the screen of said tube, a control source of electrical impulses, means responsive to said control source of electrical impulses for varying said light signal and control means responsive to said varying light signal including a reflecting prism associated with the receiving tube, photo-electric cells adapted to receive light reflected from said prism and electrical connections from said cells to electrical means having opposing armatures of such character that when the currents from said cells are equal the torque in each of said armatures is equal.

5. An automatic control for movable objects comprising, in combination, a movable object, a cathode ray receiving tube, means for producing a visible light signal on the screen of said tube, a control source of electrical impulses, means responsive to said control soure of electrical impulses for varying said light signal and control means responsive to said varying light signal including a reflecting prism associated with the receiving tube, photo-electric cells adapted to receive light reflected from said prism, a motor having a plurality of armatures electrically connected to said cells and opposed to each other such that when the currents from said cells are equal the torque in each of said armatures is equal and there is no motion in the rotor of the motor, and means for connecting said motor to control means and varying the position of the movable object.

6. In an automatic control for aircraft, the combination of a source of controlling radiations, a cathode ray receiving tube for said radiations, an electron gun in said tube, a fluorescent screen, deflecting means for the cathode beam from the electron gun, a reflecting prism located in a manner such that light produced by the bombardment of the cathode ray on the fluorescent screen is reflected by said prism, photo-electric cells oppositely placed with respect to said prism to pick up light rays reflected by said prism, means for amplifying the current and impulses set up in said cells by light beams reflected from said prism, a direct current motor having a plurality of armatures electrically connected to said cells and opposed to each other such that when the currents from said cells are equal the torque in each of said armatures is equal and there is no motion in the rotor of the motor.

7. A system of automatic control for aircraft comprising, in combination, a source of broadcasting a radio beam, pickup means for picking up said beam in an aircraft and translating it into electrical impulses, means for translating said impulses into an optically visible signal including a cathode ray receiving tube, an electron gun, a fluorescent screen, deflecting means for the cathode beam from the electron gun, a sweep circuit connected to said deflecting means and adapted to cause the cathode ray to swing back and forth on the fluorescent screen and electrical connections between the pickup means and the cathode gun to modulate the cathode beam, a reflecting prism located in a manner such that light produced by the bombardment of the cathode ray on the fluorescent screen is reflected by said prism, photo-electric cells adapted to receive reflections from said prism, means for amplifying the current and impulses set up in said cells, a motor having a plurality of armatures electrically connected to said cells and opposed to each other such that when the currents from said cells are equal the torque in each of said armatures is equal and there is no motion in the rotor of the motor, and means for connecting said motor to an automatic pilot whereby said automatic pilot is operated to correct the course of the aircraft when the motor rotates.

8. In an automatic control for aircraft, the combination of a cathode ray transmitting tube having an electron gun, deflecting means and a photo-electric screen for receiving an image of an object, a cathode ray receiving tube having an electron gun, deflecting means and a fluorescent screen, electrical connections between the screen of the transmitting tube and the electron gun of the receiving tube whereby electrical impulses set up in the transmitting tube are impressed upon and serve to modulate the cathode ray beam of the receiving tube, electrical connections between the deflecting plates of the transmitting tube and receiving tube whereby the cathode beam of the receiving tube scans the fluorescent screen in synchronism with the cathode beam of the transmitting tube, means for focusing the transmitting tube on an object in a limited field, and means for maintaining said transmitting tube focused on said object while in the field regardless of relative motion between the transmitting tube and the object, said means including a reflecting prism located in a manner such that light produced by the bombardment of the cathode ray on the fluorescent screen is reflected by said prism, photo-electric cells adapted to receive reflections from said prism, means for amplifying the current and impulses set up in said cells by light beams reflected from said prism, a motor having a plurality of armatures electrically connected to said cells and opposed to each other such that when the currents from said cells are equal the torque in each of said armatures is equal and there is no motion in the rotor of the motor and means connecting said motor with said transmitting tube adapted to correct the position of the transmitting tube as it moves relative to the object.

9. An automatic drift control for aircraft in fog comprising, in combination, a cathode ray transmitting tube having an electron gun, deflecting means and a photo-electric screen sensitive to infra-red radiation, an infra-red filter capable of passing substantially infra-red rays only and a lens adapted to focus radiations from an object passing through said filter on said screen, a cathode ray receiving tube comprising an electron gun, deflecting means and a fluorescent screen, means for impressing the electrical impulses set up in the photo-electric screen of the cathode ray transmitting tube upon the gun of the receiving tube and electrical connections between the deflecting means of said tube and a common source of potential whereby the cathode ray beam in the receiving tube scans the fluorescent screen in synchronism with the cathode ray beam of the transmitting tube, a variable band screen having parallel bands each of decreasing intensity of transparency associated with the receiving tube located in such a manner that the light produced by the bombardment of the cathode ray on the fluorescent screen is reflected through said variable band screen, means for adjusting said screen so that the images of objects on the ground within the field of view of the transmitting tube move parallel to the bands, means associated with said screen for indicating the angle of drift, means for focusing the light passing through said variable band screen onto a photo-electric cell whereby a varying current is produced in said cell when the light passing through the variable band screen is of varying intensity, means for amplifying said varying current and means for impressing the amplified current upon the vertical deflecting plates of a cathode ray oscillograph, horizontal deflecting plates in said oscillograph connected to a sweep circuit, a reflecting prism associated with said oscillograph in such a manner that the light produced by the bombardment of the cathode ray on the fluorescent screen of said oscillograph is reflected by said prism, photo-electric cells adapted to receive reflections from said prism, means for amplifying the current and impulses set up in said cells by light beams reflected from said prism, a motor having a plurality of direct current armatures electrically connected to said cells and opposed to each other such that when the currents from said cells are equal the torque in each of said armatures is equal and there is no motion in the rotor of the motor, and an automatic pilot responsive to said motor which automatically corrects for the drift of the plane when the motor rotates.

10. An automatic drift control for aircraft comprising, in combination, a cathode ray transmitting tube having an electron gun and a photo-electric screen, a cathode ray receiving tube having an electron gun, means for impressing electrical impulses set up in the photo-electric screen of the transmitting tube upon the gun of the receiving tube, means for causing the cathode ray beam in the transmitting tube to scan the photo-electric screen therein, means for causing the cathode ray beams in the transmitting and receiving tubes to move in synchronism automatically, a variable band screen having parallel bands each of decreasing intensity of transparency located in such a manner that light produced by the bombardment of the cathode ray on a screen in said receiving tube is reflected through said variable band screen, means for adjusting said screen so that images of fixed objects within the field of view of the transmitting tube move parallel to the bands, means for focusing the light passing through said variable band screen onto a photo-electric cell whereby a varying current is produced in said cell when the light passing through the variable band screen is of varying intensity, and means responsive to said varying current adapted to operate an automatic pilot which automatically corrects for the drift of the aircraft.

11. An automatic drift control for aircraft comprising, in combination, a cathode ray transmitting tube having an electron gun and a photo-electric screen, a cathode ray receiving tube comprising an electron gun, means for impressing electrical impulses set up on the photo-electric screen of the cathode ray transmitting tube onto the gun of the receiving tube, means for causing the cathode ray beam in the transmitting tube to scan the photo-electric screen therein, means for causing the cathode ray beams in the transmitting and receiving tubes to move in synchronism automatically, a variable band screen having parallel bands located in such a manner that light produced by the bombardment of the cathode ray on a screen in said receiving tube is reflected through said variable band screen, means for adjusting said screen so that fixed objects within the field of view of the transmitting tube move parallel to the bands, means whereby light of varying intensity passing through said variable band screen is adapted to produce a varying current, and means responsive to said varying current adapted to automatically correct for drift of the aircraft.

12. In an automatic control instrument, the combination of a cathode ray receiving tube, a pyramidal reflecting prism associated with said tube and located in such a manner that the light produced by the bombardment of the cathode ray on a fluorescent screen in said tube is reflected from said prism, opposing photo-electric cells adapted to receive light reflected from said prism, electrical means having direct current opposing armatures electrically connected to said opposing photo-electric cells by an electrical circuit and a reversing switch in said circuit.

HERBERT E. JONES.

CERTIFICATE OF CORRECTION.

Patent No. 2,237,440.   April 8, 1941.

HERBERT E. JONES.

It is hereby certified that error appears in the printed specification of the above numbered patent requiring correction as follows: Page 3, first column, line 9, for the word "head" read --heard--; page 6, second column, line 16, claim 7, for "source of" read --source for--; line 59, claim 8, for "chronisum" read --chronism--; and that the said Letters Patent should be read with this correction therein that the same may conform to the record of the case in the Patent Office.

Signed and sealed this 3rd day of June, A. D. 1941.

(Seal)

Henry Van Arsdale,
Acting Commissioner of Patents.